US007184030B2

(12) United States Patent
McCharles et al.

(10) Patent No.: US 7,184,030 B2
(45) Date of Patent: Feb. 27, 2007

(54) SYNCHRONIZATION OF CAMERAS IN CAMERA-BASED TOUCH SYSTEM TO ENHANCE POSITION DETERMINATION OF FAST MOVING OBJECTS

(75) Inventors: Randy McCharles, Calgary (CA); Gerald Morrison, Calgary (CA); Steve Worthington, Calgary (CA); Trevor Akitt, Calgary (CA)

(73) Assignee: Smart Technologies Inc. (CA)

( * ) Notice: Subject to any disclaimer, the term of this patent is extended or adjusted under 35 U.S.C. 154(b) by 511 days.

(21) Appl. No.: 10/724,633

(22) Filed: Dec. 2, 2003

(65) Prior Publication Data

US 2004/0108996 A1  Jun. 10, 2004

(51) Int. Cl.
G09G 5/00  (2006.01)
(52) U.S. Cl. ...................... 345/173; 345/175
(58) Field of Classification Search ........ 345/156–160, 345/173–175, 177–183; 178/18.01, 18.1, 178/19.01
See application file for complete search history.

(56) References Cited

U.S. PATENT DOCUMENTS

| | | | |
|---|---|---|---|
| 4,144,449 A | 3/1979 | Funk et al. | |
| 4,507,557 A | 3/1985 | Tsikos | 250/341 |
| 4,558,313 A | 12/1985 | Garwin | |
| 4,742,221 A | 5/1988 | Sasiki et al. | 250/221 |
| 4,746,770 A | 5/1988 | McAvinney | 178/18 |
| 4,818,826 A | 4/1989 | Kimura | 178/19 |
| 5,097,516 A | 3/1992 | Amir | |
| 5,317,140 A | 5/1994 | Dunthorn | 250/221 |
| 5,483,261 A | 1/1996 | Yasutake | |

(Continued)

FOREIGN PATENT DOCUMENTS

CA  2493236 A1  12/2003

(Continued)

OTHER PUBLICATIONS

International Search report with a date of mailing of Oct. 22, 2001 for PCT/CA 01/00980 with an International Filing Date of Jul. 5, 2001.

Primary Examiner—Richard Hjerpe
Assistant Examiner—Mansour M. Said
(74) Attorney, Agent, or Firm—Katten Muchin Rosenman LLP

(57) ABSTRACT

A camera-based touch system includes at least one pair of cameras having overlapping fields of view and a touch surface encompassed within the overlapping fields of view across which a pointer is moved. The cameras of the at least one pair acquire images at intervals asynchronously. In order to estimate the position of the pointer relative to the touch surface from image data acquired by the at least one pair of cameras, the images are synthetically synchronized. During this process, for each camera in the pair, each acquired image is processed to determine the position of the pointer therein and the position of the pointer is recorded together with a timestamp representing the time elapsed between a reference point common to the cameras and the time the image was acquired. Successive pairs of recorded positions are interpolated to generate interpolated positions and the interpolated positions are recorded together with synchronization times representing times the images would have been acquired had the cameras been synchronized. Interpolated positions generated by the cameras having equivalent associated synchronization times are determined and these interpolated positions are triangulated to estimate the position of the pointer relative to the touch surface.

24 Claims, 6 Drawing Sheets

U.S. PATENT DOCUMENTS

| | | | |
|---|---|---|---|
| 5,502,568 A | 3/1996 | Ogawa et al. | 356/375 |
| 5,581,276 A | 12/1996 | Cipolla et al. | |
| 5,638,092 A | 6/1997 | Eng et al. | |
| 5,737,740 A | 4/1998 | Henderson et al. | |
| 5,825,352 A | 10/1998 | Bisset et al. | |
| 5,936,615 A | 8/1999 | Waters | 345/173 |
| 5,963,199 A | 10/1999 | Kato et al. | |
| 5,982,352 A | 11/1999 | Pryor | |
| 6,008,798 A | 12/1999 | Mato, Jr. et al. | 345/168 |
| 6,061,177 A * | 5/2000 | Fujimoto | 359/443 |
| 6,100,538 A | 8/2000 | Ogawa | 250/559.38 |
| 6,161,066 A | 12/2000 | Wright et al. | |
| 6,208,330 B1 | 3/2001 | Hasegawa et al. | 345/173 |
| 6,256,033 B1 | 7/2001 | Nguyen | |
| 6,310,610 B1 | 10/2001 | Beaton et al. | |
| 6,323,846 B1 | 11/2001 | Westerman | |
| 6,335,724 B1 | 1/2002 | Takekawa et al. | 345/173 |
| 6,339,748 B1 | 1/2002 | Hiramatsu | |
| 6,359,612 B1 | 3/2002 | Peter et al. | |
| 6,414,671 B1 | 7/2002 | Gillespie et al. | 345/157 |
| 6,421,042 B1 | 7/2002 | Omura et al. | 345/157 |
| 6,429,856 B1 | 8/2002 | Omura et al. | |
| 6,507,339 B1 | 1/2003 | Tanaka | |
| 6,531,999 B1 | 3/2003 | Trajkovic | 345/157 |
| 6,559,813 B1 * | 5/2003 | DeLuca et al. | 345/8 |
| 6,563,491 B1 | 5/2003 | Omura | 345/173 |
| 6,594,023 B1 | 7/2003 | Omura et al. | |
| 6,674,424 B1 * | 1/2004 | Fujioka | 345/157 |
| 6,710,770 B2 | 3/2004 | Tomasi et al. | |
| 6,774,889 B1 | 8/2004 | Zhang et al. | |
| 6,803,906 B1 | 10/2004 | Morrison et al. | |
| 6,933,981 B1 | 8/2005 | Kishida et al. | |
| 7,007,236 B2 | 2/2006 | Dempski et al. | |
| 7,030,861 B1 | 4/2006 | Westerman et al. | |
| 2001/0019325 A1 | 9/2001 | Takekawa | 345/157 |
| 2001/0022579 A1 | 9/2001 | Hirabayashi | 345/175 |
| 2001/0026268 A1 | 10/2001 | Ito | 345/175 |
| 2001/0033274 A1 | 10/2001 | Ong | |
| 2002/0036617 A1 | 3/2002 | Pryor | |
| 2003/0001825 A1 | 1/2003 | Omura et al. | |
| 2003/0025951 A1 | 2/2003 | Pollard et al. | |
| 2003/0085871 A1 | 5/2003 | Ogawa | |
| 2004/0021633 A1 | 2/2004 | Rajkowski | |
| 2004/0046749 A1 * | 3/2004 | Ikeda | 345/173 |
| 2004/0178997 A1 | 9/2004 | Gillespie et al. | |
| 2004/0189720 A1 | 9/2004 | Wilson et al. | |
| 2005/0052427 A1 | 3/2005 | Wu et al. | |

FOREIGN PATENT DOCUMENTS

| | | |
|---|---|---|
| DE | 198 10 | 12/1998 |
| DE | 198 10 452 A1 | 12/1998 |
| JP | 57-211637 | 12/1982 |
| JP | 8-240407 | 9/1996 |
| JP | 9-91094 | 4/1997 |
| JP | 9-319501 | 12/1997 |
| WO | WO 99/40562 | 8/1999 |
| WO | 02/03316 A1 | 1/2002 |
| WO | 2003/105074 A2 | 12/2003 |

* cited by examiner

SYNCHRONIZATION OF CAMERAS IN CAMERA-BASED TOUCH SYSTEM TO ENHANCE POSITION DETERMINATION OF FAST MOVING OBJECTS

This application claims the benefit of U.S. patent application Ser. No. 10/180,897, filed Jun. 27, 2002. The entire contents of this prior application are incorporated herein by reference.

FIELD OF THE INVENTION

The present invention relates generally to camera-based touch systems and in particular to synchronization of camera images in a camera-based touch system to enhance position determination of fast moving objects.

BACKGROUND OF THE INVENTION

Camera-based touch systems that use cameras to acquire images of a touch surface and process the image data to determine the position of a pointer relative to the touch surface are known. For example, International PCT Application No. WO 02/03316 to Smart Technologies Inc. et al discloses a camera-based touch system including a passive touch surface and a plurality of cameras associated with the touch surface. The cameras have overlapping fields of view encompassing the touch surface. The cameras acquire images of the touch surface from different locations and generate image data. A processor receives and processes the image data generated by the cameras to determine the location of a pointer captured in the images relative to the touch surface using triangulation.

In order to triangulate the position of the pointer accurately, especially in situations where the pointer is moving quickly across the touch surface, it is necessary to synchronize the cameras. This is due to the fact that if the cameras are not synchronized, each camera will capture an image of the pointer at a different time and therefore, will see the pointer at a different position on the touch surface. This of course makes the results of triangulation unpredictable and inaccurate.

It is therefore an object of the present invention to provide a novel system and method for synchronizing camera images in a camera-based touch system to enhance position determination of fast moving objects.

SUMMARY OF THE INVENTION

According to one aspect of the present invention there is provided in a camera-based touch system including at least one pair of cameras having overlapping fields of view and a touch surface encompassed within said overlapping fields of view across which a pointer is moved, wherein the cameras of said at least one pair acquire images at intervals asynchronously, a method of synchronizing image data acquired by said at least one pair of cameras comprising the step of:

for each camera in said pair:

processing each acquired image to determine the position of said pointer therein and recording the position together with a timestamp representing the time elapsed between a reference point common to said cameras and the time the image was acquired; and interpolating between pairs of recorded positions to generate interpolated positions and recording each interpolated position together with a synchronization time representing a time each image would have been acquired had said cameras been synchronized.

Preferably, the interpolating is performed between each successive pair of recorded positions. The reference point is preferably, a signal sent to each of the cameras simultaneously. A timer associated with each camera is initiated in response to the signal and the value of the timer is read when each image is acquired thereby to determine the timestamp.

According to another aspect of the present invention there is provided in a camera-based touch system including at least one pair of cameras having overlapping fields of view and a touch surface encompassed within said overlapping fields of view across which a pointer is moved, wherein the cameras of said at least one pair acquire images at intervals asynchronously, a method of estimating the position of said pointer relative to said touch surface from image data acquired by said at least one pair of cameras, said method comprising the step of:

for each camera in said pair:

processing each acquired image to determine the position of said pointer therein and recording the position together with a timestamp representing the time elapsed between a reference point common to said cameras and the time the image was acquired; and interpolating between successive pairs of recorded positions to generate interpolated positions and recording said interpolated positions together with synchronization times representing times the images would have been acquired had said cameras been synchronized; and determining interpolated positions generated by said cameras having equivalent associated synchronization times and triangulating the interpolated positions to estimate the position of the said pointer relative to said touch surface.

In accordance with yet another aspect of the present invention there is provided a camera-based touch system comprising:

at least one pair of cameras associated with a touch surface and having overlapping fields of view encompassing said touch surface, said at least one pair of cameras acquiring images of said touch surface from different locations and generating image data;

a processor receiving and processing the image data generated by said at least one pair of cameras to determine the location of an object relative to the touch surface by triangulation when the object is captured in images acquired by the at least one pair of cameras; and a synchronization mechanism to synchronize image data generated by said at least one pair of cameras.

In accordance with still yet another aspect of the present invention there is provided a method of determining the position of a pointer relative to a touch surface comprising the steps of:

acquiring synchronized image data of said touch surface from different locations using cameras having overlapping fields of view; and processing the image data to yield pointer position data; and triangulating the pointer position data to determine the position of said pointer relative to said touch surface.

The present invention provides advantages in that since the position of the pointer is derived from synchronized camera image data, the pointer position relative to the touch surface can be accurately determined using triangulation. In the case of asynchronously captured images, the pointer position data derived from images is adjusted to approximate pointer position data that would have been derived from the images had the images been synchronously captured. In this manner, the position of the pointer can be accurately determined using triangulation notwithstanding the asynchronous image acquisition.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
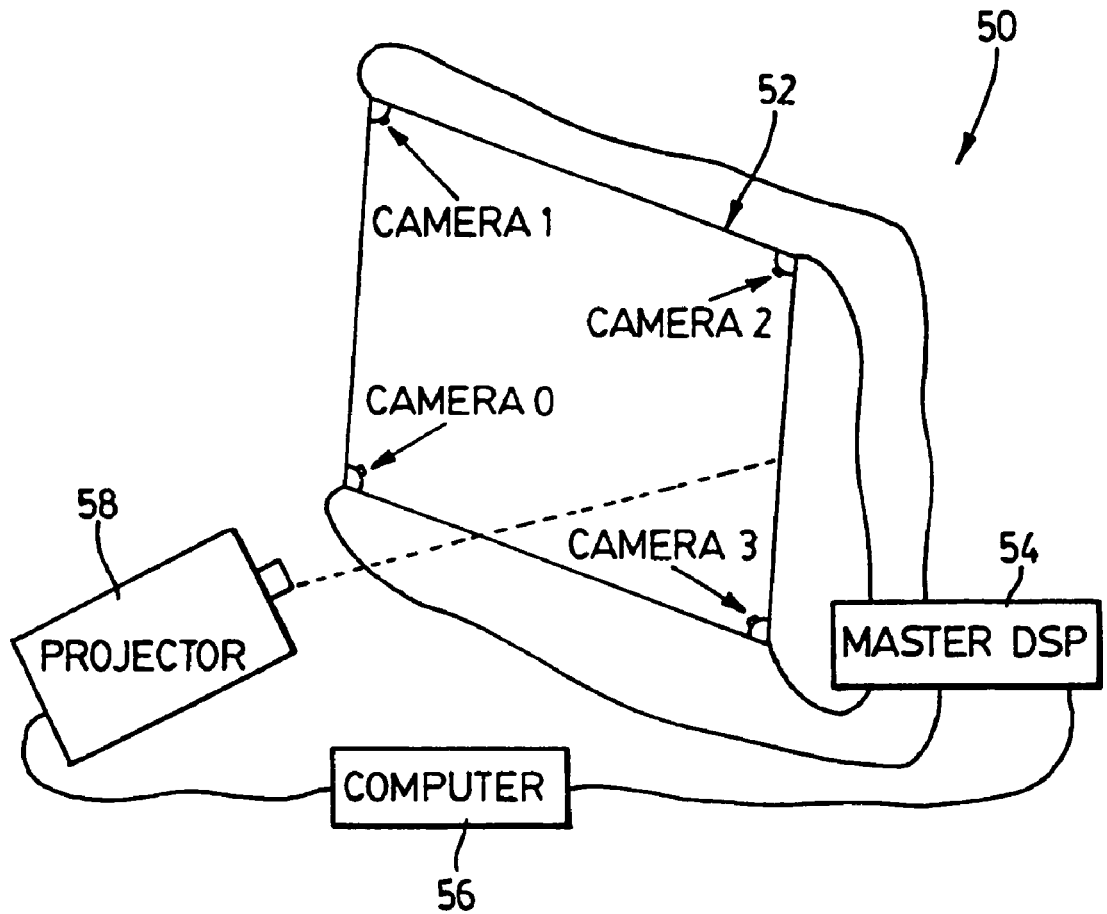
FIG. 1 is a schematic diagram of a camera-based touch system in accordance with the present invention.

Turning now to FIG. 1, a camera-based touch system such as that described in International PCT No. WO 02/03316 filed on Jul. 5, 2001, assigned to the assignee of the present invention, the contents of which are incorporated herein by reference, is shown and is generally identified by reference numeral 50. As can be seen, touch system 50 includes a touch screen 52 coupled to a digital signal processor (DSP) based master controller 54. Master controller 54 is also coupled to a computer 56. Computer 56 executes one or more application programs and provides display output that is presented on the touch screen 52 via a projector 58. The touch screen 52, master controller 54, computer 56 and projector 58 form a closed-loop so that user contacts with the touch screen 52 can be recorded as writing or drawing or used to control execution of application programs executed by the computer 56.

Figure 2:
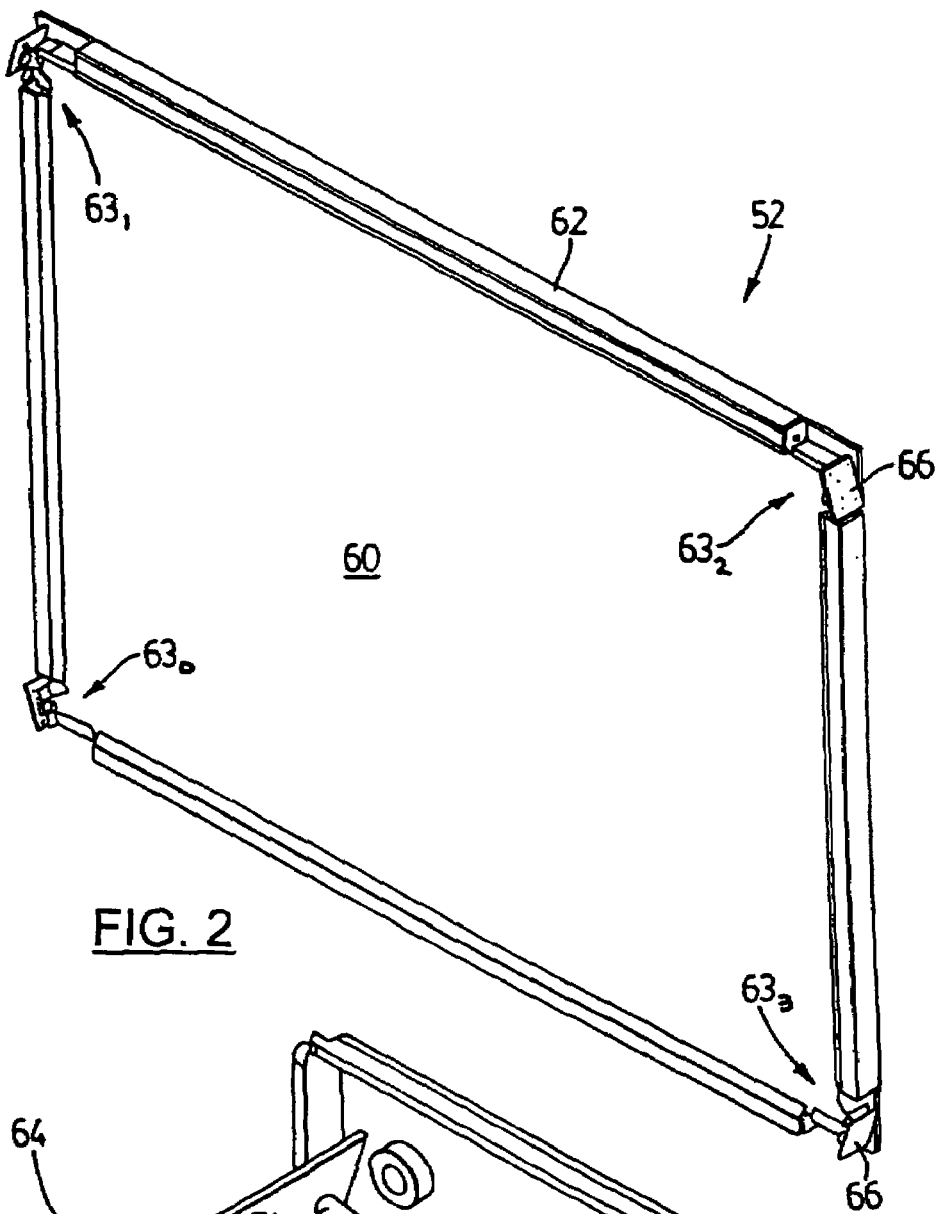
FIG. 2 is an isometric view of a touch screen forming part of the touch system of FIG. 1.
Figure 3:
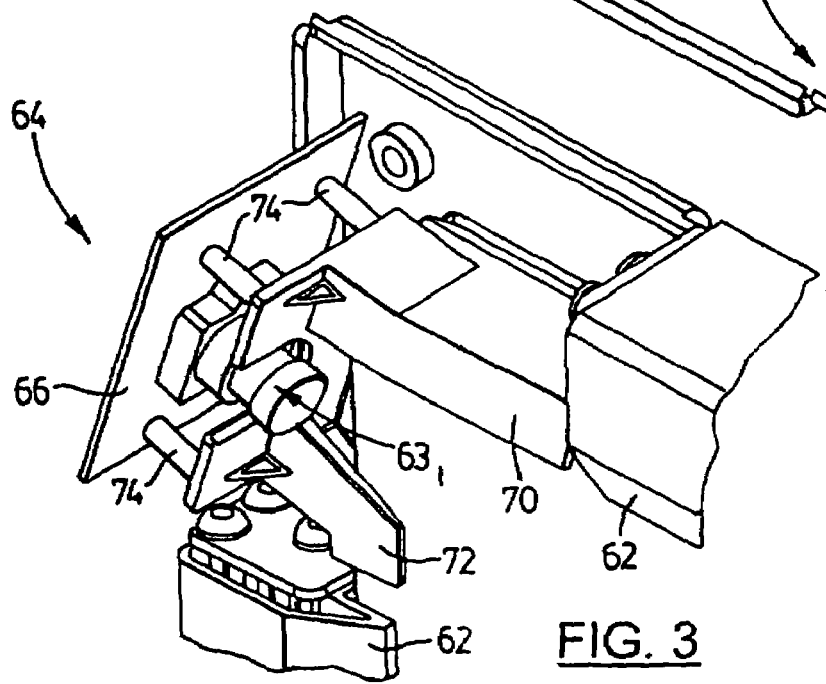
FIG. 3 is an isometric view of a corner portion of the touch screen of FIG. 2.
Figure 4:
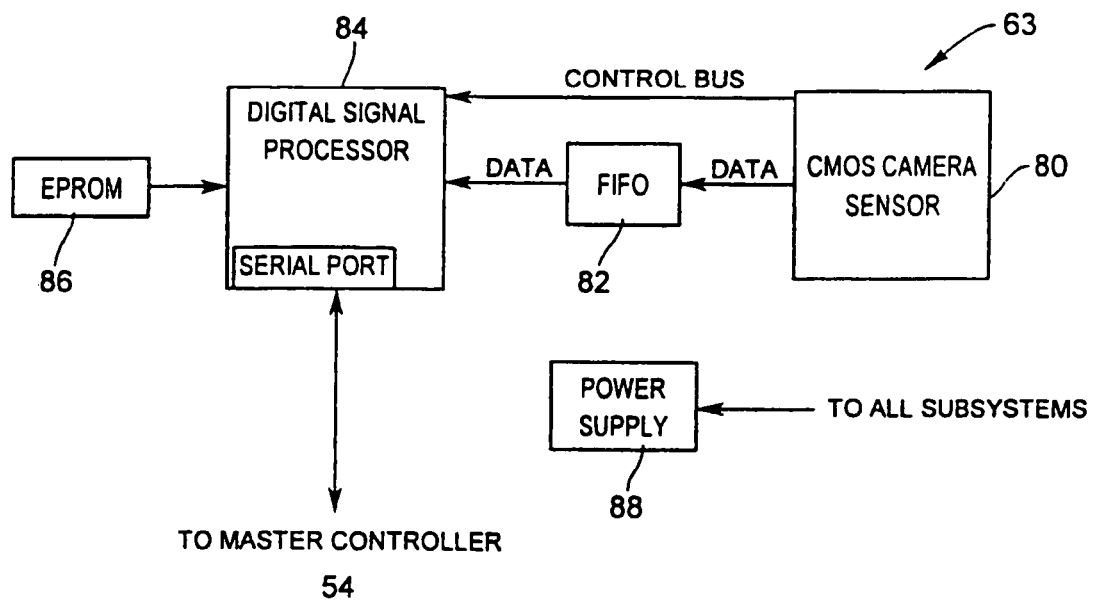
FIG. 4 is a schematic diagram of a digital camera forming part of the touch screen of FIG. 2.

FIGS. 2 to 4 better illustrate the touch screen 52. Touch screen 52 includes a touch surface 60 bordered by a rectangular frame 62. Touch surface 60 is in the form of a rectangular planar sheet of passive material. DSP-based CMOS digital cameras $63_0$ to $63_3$ are positioned adjacent each corner of the touch screen 52. Each digital camera $63_N$ is mounted on a frame assembly 64. Each frame assembly 64 includes an angled support plate 66 on which the digital camera $63_N$ is mounted. Supporting frame elements 70 and 72 are mounted on the plate 66 by way of posts 74 and secure the plate 66 to the frame 62.

Each digital camera $63_N$ includes a two-dimensional CMOS image sensor 80 having an associated lens assembly, a first-in-first-out (FIFO) buffer 82 coupled to the image sensor 80 by a data bus and a digital signal processor (DSP) 84 coupled to the FIFO 82 by a data bus and to the image sensor 80 by a control bus. A boot EPROM 86 and a power supply subsystem 88 are also included.

In the present embodiment, the CMOS camera image sensor 80 is a National LM9617 image sensor configured for a 640×20 pixel subarray that can be operated to capture image frames at rates in excess of 200 frames per second. Arbitrary pixel rows of the image sensor 80 can be selected. Since the pixel rows can be arbitrarily selected, the pixel subarray can be exposed for a greater duration for a given digital camera frame rate providing for good operation in darker rooms in addition to well lit rooms. The FIFO buffer 82 is manufactured by Cypress under part number CY7C4211V and the DSP 84 is manufactured by Analog Devices under part number ADSP2185M.

The DSP 84 receives and processes image frames from the image sensor 80 to determine the x-positions of a pointer within the image frames. In addition, the DSP 84 provides control information to the image sensor 80 via the control bus. The control information allows the DSP 84 to control parameters of the image sensor 80 such as exposure, gain, array configuration, reset and initialization. The DSP 84 also provides clock signals to the image sensor 80 to control the frame rate of the image sensor 80.

Figure 6:
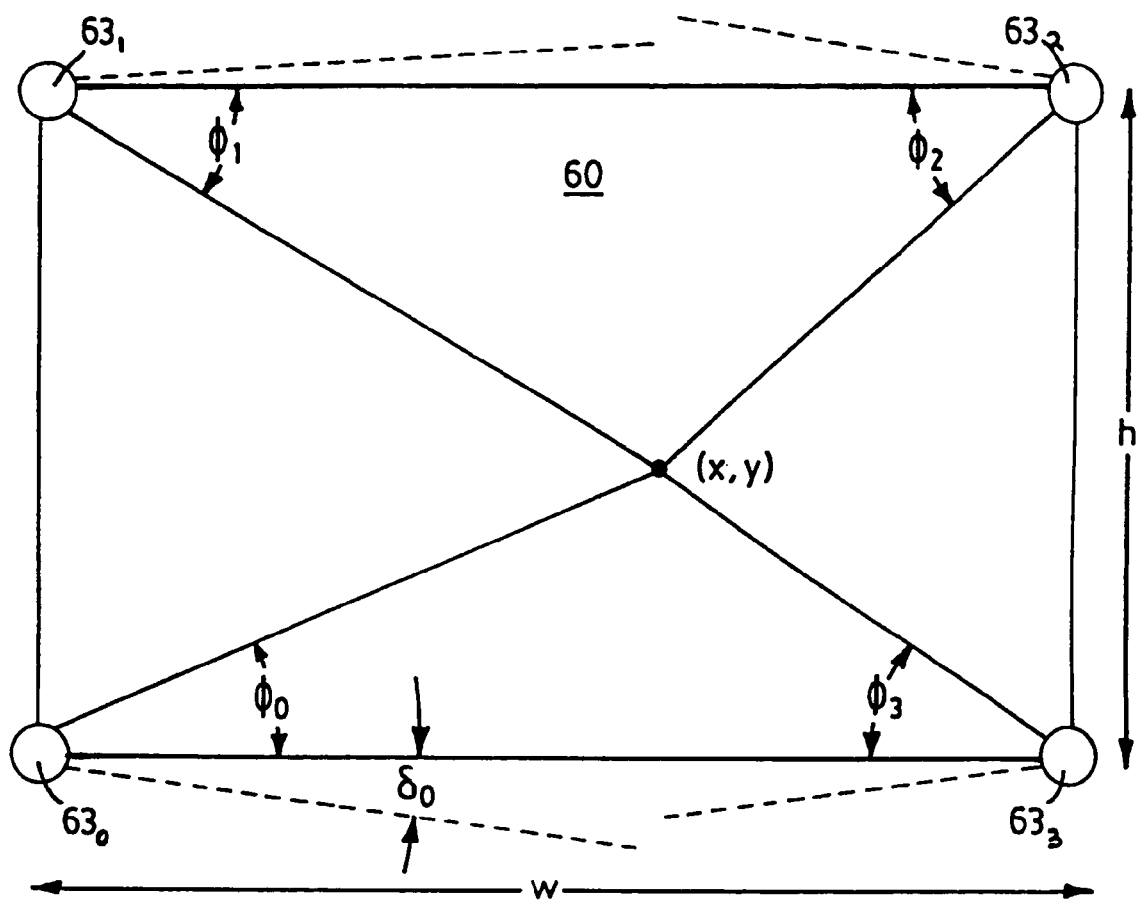
FIG. 6 shows triangulation geometry used to calculate a pointer contact position on the touch surface of the touch screen.

The angle of the plate 66 and the optics of the digital cameras $63_N$ are selected so that the field of view (FOV) of each digital camera $63_N$ is slightly beyond 90°. In this way, the entire touch surface 60 is within the field of view of each digital camera $63_N$ with the field of view of each digital camera $63_N$ extending slightly beyond a designated peripheral edge of the touch surface 60 as shown in FIG. 6.

Figure 5:
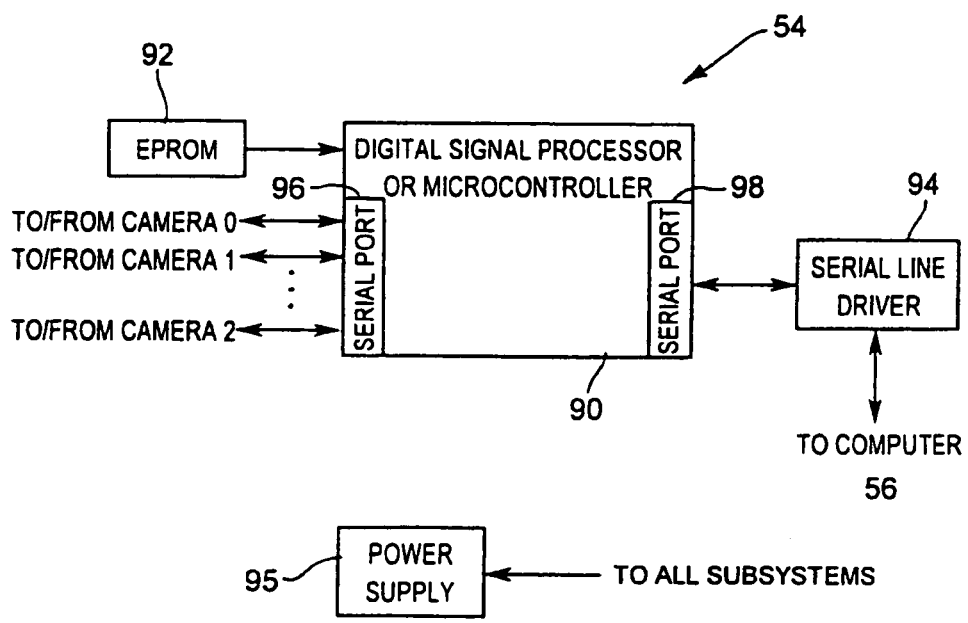
FIG. 5 is a schematic diagram of a master controller forming part of the touch system of FIG. 1.

Master controller 54 is best illustrated in FIG. 5 and includes a DSP 90, a boot EPROM 92, a serial line driver 94 and a power supply subsystem 95. The DSP 90 communicates with the DSPs 84 of the digital cameras $63_0$ to $63_3$ over a data bus via a serial port 96 and communicates with the computer 56 over a data bus via a serial port 98 and the serial line driver 94. In this embodiment, the DSP 90 is manufactured by Analog Devices under part number ADSP2185M. The serial line driver 94 is manufactured by Analog Devices under part number ADM222.

The master controller 54 and each digital camera $63_N$ follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras $63_0$ to $63_3$ and to the DSP 90 in the master controller 54 and the remaining two (2) channels are unused. The master controller 54 monitors the twenty-four (24) channels assigned to the DSPs 84. The DSPs 84 monitor the six (6) channels assigned to the DSP 90 of the master controller 54. Communications between the master controller 54 and the digital cameras $63_0$ to $63_3$ are performed as background processes in response to interrupts.

The operation of the touch system 50 will now be described. Initially, a camera offset angle calibration routine is performed to determine the offset angle δ of each digital camera $63_N$ (see FIG. 6). Details of the camera offset angle calibration are described in Applicants' co-pending U.S. application Ser. No. 09/870,698 entitled "Calibrating Camera Offsets to Facilitate Object Position Determination Using Triangulation" filed on Jun. 1, 2001, the content of which is incorporated herein by reference.

With the touch system 50 calibrated, each digital camera $63_N$ acquires image frames of the touch surface 60 within the field of view of its image sensor 80 at a desired frame rate and processes each acquired image frame to determine if a pointer is in the acquired image frame. During this operation, the DSP 84 reads each image frame from the FIFO buffer 82 and processes the image frame.

If a pointer is in the acquired image frame, the image frame is further processed by the DSP 84 to determine the x-position of the pointer. The z-position of the pointer is also determined so that a determination can be made as to whether the pointer is contacting or hovering above the touch surface 60. The x-position data generated by the DSP 84 is then adjusted for camera synchronization purposes, as will be described. Pointer information packets (PIPs) including the pointer position information, status and/or diagnostic information are then generated by the DSP 84 and the PIPs are queued for transmission to the master controller 54. The digital cameras $63_0$ to $63_3$ also receive and respond to command PIPs generated by the master controller 54.

The master controller 54 polls the digital cameras $63_0$ to $63_3$ for PIPs in the queues. In this particular embodiment, the master controller 54 polls the digital cameras at a rate exceeding the image sensor frame rates. Upon receipt of PIPs from the digital cameras $63_N$, the master controller 54 examines the PIPs to determine if the PIPs include pointer location data. If the PIPs include pointer location data, the master controller 54 triangulates the pointer location data in the PIPs to determine the position of the pointer relative to the touch surface 60 in Cartesian rectangular coordinates. The master controller 54 in turn transmits calculated pointer position data, status and/or diagnostic information to the computer 56. In this manner, the pointer position data transmitted to the computer 56 can be recorded as writing or drawing or can be used to control execution of application programs executed by the computer 56. The computer 56 also updates the display output conveyed to the projector 58 so that information presented on the touch surface 60 reflects the pointer activity.

The master controller 54 also receives commands from the computer 56 and responds accordingly as well as generates and conveys command PIPs to the digital cameras $63_N$. Specifics of the manner in which the cameras $63_N$ determine the pointer x and z positions from the image frame data and create PIPs is described in International PCT Application No. WO 02/03316 and therefore, will not be described herein.

Figure 7:
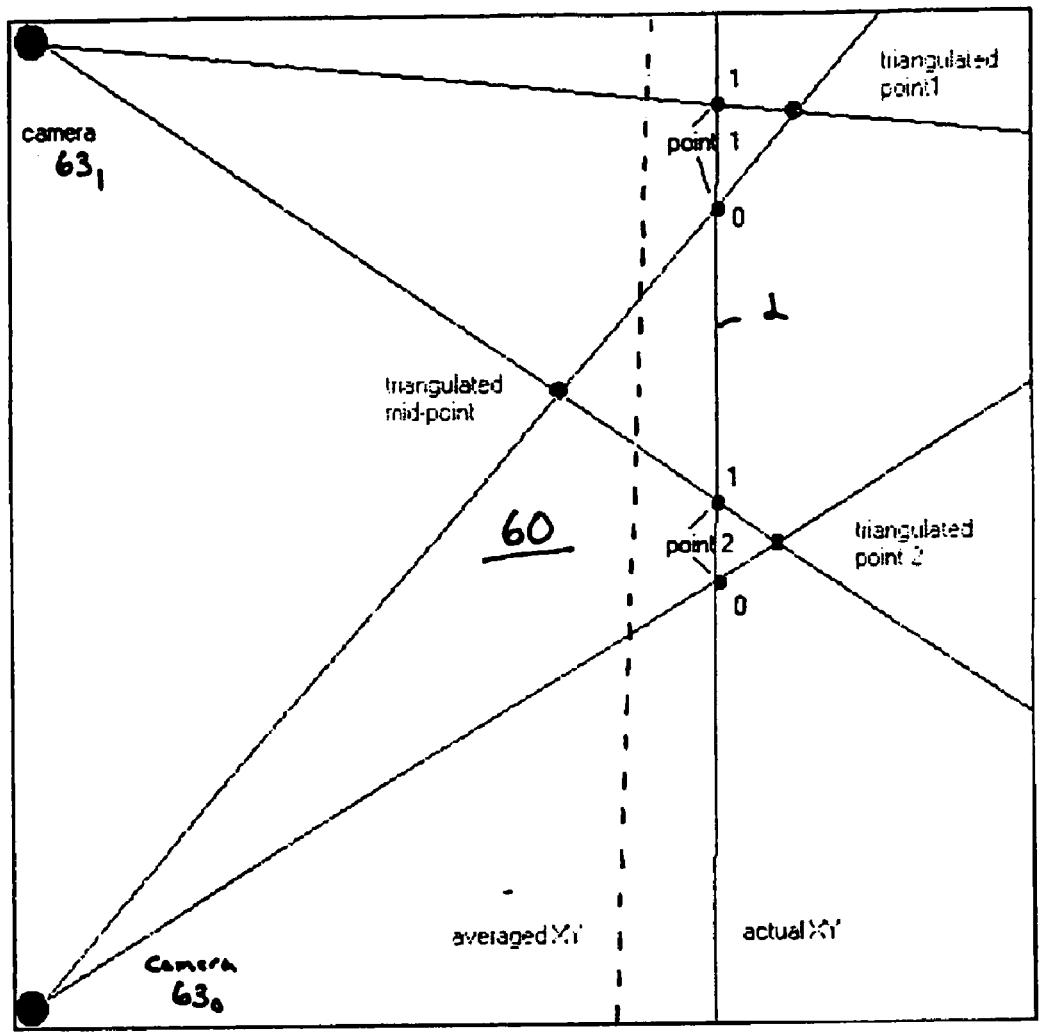
FIG. 7 is an isometric view of a portion of the touch screen showing how a pair of cameras sees the position of a pointer when the pointer is moved quickly across the touch surface during asynchronous image acquisition.

When a pointer is stationary on the touch surface 60 or when the pointer is moving slowly across the touch surface 60, the triangulated positions of the pointer relative to the touch surface 60 over time are accurate. However, when the pointer moves quickly across the touch surface 60, a pair of digital cameras $63_N$ capturing images of the pointer will see the pointer at different positions on the touch surface 60 if the digital cameras $63_N$ are capturing images at different times. FIG. 7 illustrates the above scenario. In this example, camera $63_1$ captures images of the pointer slightly ahead of digital camera $63_0$. Therefore, as line L is drawn across the touch surface 60, the pointer x-position returned by each digital camera $63_N$, each time that digital camera acquires an image, is different. As a result, triangulating the x-positions returned by the digital cameras, results in inaccuracies.

Figure 8:
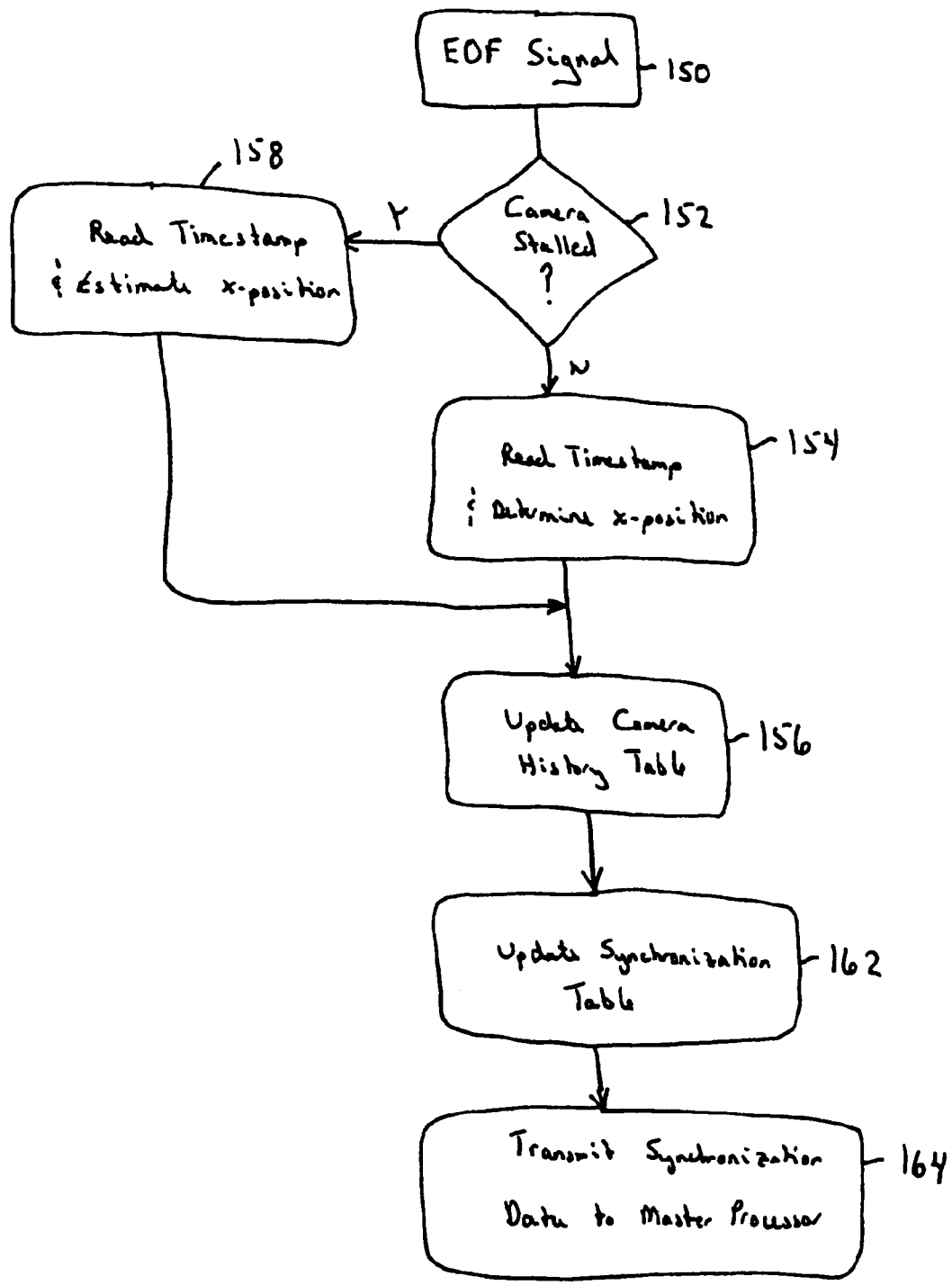
FIG. 8 is a flowchart showing the steps performed by each camera during x-position adjustment to synthesize camera synchronization.

Accordingly, to deal with the above problem, in one embodiment of the present invention the camera-based touch system 50 performs synthetic camera synchronization to maintain triangulation accuracy notwithstanding the fact that the digital cameras $63_N$ acquire images asynchronously. In particular, during synthetic camera synchronization DSPs 84 in the digital cameras $63_N$ adjust the x-position data derived from captured image frames to approximate x-position data that would have been derived from the image frames had the image frames been synchronously captured by the digital cameras $63_N$. Specifics concerning synthetic camera synchronization will now be described with particular reference to FIG. 8.

When the DSP 84 in a digital camera $63_N$ receives an EOF signal from its associated image sensor 80 (step 150), signifying that a new image frame is ready to be read from the FIFO buffer 82, the DSP 84 examines the status of the digital camera $63_N$ to determine if the digital camera has stalled (step 152). If the camera has not stalled, the value of the DSP internal timer ("TimeStamp") is read and the image frame is processed to determine the x-position of the pointer in the image frame (step 154). The TimeStamp and the pointer x-position form an entry that is used to update a camera history table maintained by the DSP 84 (step 156).

At step 152, if the digital camera $63_N$ has stalled (i.e. image processing for the prior image frame has not been completed by the DSP 84), to avoid losing the TimeStamp read from the DSP internal timer, the x-position is estimated by extrapolating the x-positions of the previous two entries in the camera history table (step 158). The extrapolated x-position and the TimeStamp form an entry that is used to update the camera history table (step 156). This procedure is considered as error recovery, due to the fact that problems can arise if stalled image frames become frequent or consecutive.

Once the camera history table has been updated, the DSP 84 updates a synchronization table maintained by the DSP 84 using the entries in the camera history table (step 162).

In the present embodiment, the camera history table includes six entries to ensure that triangulation can be performed even if the digital cameras $63_N$ become out of phase by four image frames. During updating of the camera history table at step 156, whenever the DSP 84 generates a new x-position and reads the TimeStamp from the DSP internal timer in response to an EOF signal, the DSP 84 rolls the camera history table back by one position. In this manner, the oldest entry in the camera history table at position [0] is discarded and the new entry is placed in the camera history table at position [5].

Table 1 below shows camera history tables maintained by the DSPs 84 of digital cameras $63_0$ and $63_1$. As can be seen, each entry in each of the camera history tables including a TimeStamp and the associated x-position.

| Camera $63_0$ | | Camera $63_1$ | |
|---|---|---|---|
| TimeStamp | x-position | TimeStamp | x-position |
| 200 | 10 | 3700 | 10 |
| 700 | 20 | 400 | 20 |
| 1200 | 30 | 900 | 30 |
| 1700 | 40 | 1400 | 40 |
| 2200 | 50 | 1900 | 50 |
| 2700 | 60 | 2400 | 60 |

Table 2 below shows the synchronization tables that are maintained by the DSPs 84 of digital cameras $63_0$ and $63_1$, based on the camera history tables of Table 1.

| SyncTime $T_s$ | Interpolated x-position $X_s$ Camera $63_0$ | Interpolated x-position $X_s$ Camera $63_1$ |
|---|---|---|
| 500 | 16 | 22 |
| 1000 | 26 | 32 |
| 1500 | 36 | 42 |
| 2000 | 46 | 52 |
| 2500 | 56 | — |
| 3000 | — | — |
| 3500 | — | — |
| 4000 | — | 16 |

As can be seen, each entry in the synchronization tables includes a synchronization time $T_S$ and an interpolated x-position $X_S$. The interpolated x-positions $X_S$ are determined as follows. Assuming that the velocity of the pointer is constant as the pointer travels between two (2) points, the interpolated x-positions are calculated using the equation:

$$X_S = ((X_1 - X_0)/(T_1 - T_0)) * (T_S - T_0) + X_0 \quad (1)$$

where:

$X_0$ and $X_1$ are successive x-position entries in the camera history tables;

$T_1$ and $T_0$ are successive TimeStamps corresponding to the x-position entries $X_1$ and $X_0$; and $T_S$ is a given synchronization time, where $T_0 \leq T_s \leq T_1$.

For example, using the first two entries in the camera history table maintained by digital camera $63_0$ shown in Table 1 and a synchronization time $T_S$ equal to 500, equation (1) yields:

$$X_S = ((20-10)/(700-200)) * (500-200) + 10 = 16$$

In order to interpolate the x-position data accurately, the DSP internal timers need to be calibrated against a common reference. This is due to the fact that the DSP internal timers, although similar, are not identical. As a result, if the DSP internal timers are not reset, a phase error will be introduced. Moreover, the maximum TimeStamp allowable for 16-bit integer math is 32767. If the TimeStamp is permitted to exceed this maximum limit, problems arise. In the present embodiment, a signal embedded in the command PIPs generated by the master controller 54, that are sent to each of the digital cameras $63_N$ simultaneously, is used by the digital cameras $63_N$ to reset the DSP internal timers.

Since the DSP internal timers are simultaneously reset, the TimeStamps constitute baseline data that exhibits the following known attributes:

i) each TimeStamp is greater than its predecessor ($T_1 > T_0$) except following a DSP internal timer reset; and ii) the elapsed time between successive TimeStamps is constant ($C = T_1 - T_0$) since the camera frame rates are constant.

As mentioned above, the attribute $T_1 > T_0$ does not hold true following a DSP internal timer reset. In this case when using equation (1) to calculate the interpolated x-position $X_S$ following a DSP internal timer reset, the term ($T_1 - T_0$) in equation (1) yields an incorrect and unpredictable value. Thus, when the attribute $T_1 > T_0$ does not hold true, the occurrence of a DSP internal timer reset can be recognized by the DSP 84 allowing TimeStamp $T_1$ to be corrected prior to performing the interpolation calculation. Since the elapsed time between successive TimeStamps is a known constant C, following a DSP internal timer reset, the TimeStamp $T_1$ is adjusted by assigning the TimeStamp $T_1$ a replacement value equal to $C + T_0$.

The synchronization times $T_S$ used by each digital camera $63_N$ during the interpolation calculations are the same and the interval between successive synchronization times $T_S$ is constant. As a result, although the TimeStamps in the camera history tables fluctuate, the synchronization times $T_S$ in the synchronization tables do not. Since the interval between successive synchronization times $T_S$ is also a known constant, following a DSP internal timer reset, the synchronization time $T_S$ can also be corrected so that the term ($T_S - T_0$) in equation (1) yields a meaningful result during the interpolation calculation.

The interval between successive synchronization times $T_S$ should be at least the same as the elapsed time constant C for camera-based touch systems that include only include one pair of cameras. For example, if the elapsed time constant C between $T_1$ and $T_0$ is equal to 500, the interval between synchronization times $T_S$ should also be equal to 500. As the number of cameras in the camera-based touch system increases, the interval between synchronization times $T_S$ should be greater than the elapsed time constant C. This results in an increase in the number of non-redundant interpolated points that are generated by the digital cameras $63_N$ and hence, an increase in touch system resolution.

When the digital cameras $63_N$ are polled by the master controller 54, the digital cameras $63_N$ package the interpolated x-positions Xs in the synchronization tables into PIPs and convey the PIPs to the master controller 54 (step 164). During polling, the master controller 54 sends a poll number to each digital camera $63_N$. The poll number signifies the synchronization time $T_s$ for which an interpolated x-position $X_s$ is desired. If the synchronization table maintained by the DSP 84 of the digital camera $63_N$ includes an interpolated x-position $X_s$ for the specified synchronization time $T_s$, the interpolated x-position $X_s$ is packaged into a PIP and the PIP is conveyed to the master controller 54.

Upon receipt of the PIPs, the master controller 54 uses interpolated x-positions $X_S$ in the PIPs received from pairs of digital cameras having equivilent synchronization times to triangulate the position of the pointer. In the example of Table 2, synchronization time 2000 is the most recent synchronization time at which digital cameras $63_0$ and $63_1$ will return interpolated x-positions $X_S$ to the master controller 54 if polled for these interpolated x-positions. As a result, these interpolated x-positions $X_s$ can used by the master controller 54 to triangulate the pointer position. Specifics of the triangulation methodology are described in International PCT Application No. WO 02/03316 and therefore, will not be described herein.

If desired, the camera history tables and the synchronization tables can be maintained by the DSP 90 of the master controller 54 or by the computer 56. In this case, the camera frame rates must be constant and known. Using the DSPs 84 to maintain the camera history tables and the synchronization tables allows the camera frame rates to be variable.

As an alternate solution to achieve digital camera synchronization, the DSP 84 in each of the digital cameras can be provided with synchronization logic that is responsive to a programmable high-speed signal generator that generates the horizontal and vertical synchronization signals for the camera image sensor 80. The high-speed signal generators are programmed to ensure that each of the digital cameras $63_N$ captures an image of the touch surface 60 at the same time so that the images captured by the digital cameras are synchronized. Although this results in synchronized camera images, it is a more costly solution than that of the first embodiment due to the fact that the synchronization logic and programmable high-speed signal generators take up real estate on the digital camera boards and therefore, increase costs.

Although the equation (1) interpolates within the interval $T_0$ to $T_1$, those of skill in the art will appreciate that it is possible to interpolate outside of the interval $T_0$ to $T_1$ although the assumption that the velocity of the pointer is constant during the interpolation interval becomes less true.

Although preferred embodiments of the present invention have been described, those of skill in the art will appreciate that variations and modifications may be made without departing from the spirit and scope thereof as defined by the appended claims.

What is claimed is:

1. In a camera-based touch system including at least one pair of cameras having overlapping fields of view and a touch surface encompassed within said overlapping fields of view across which a pointer is moved, wherein the cameras of said at least one pair acquire images at intervals asynchronously, a method of synchronizing image data acquired by said at least one pair of cameras comprising the step of:

for each camera in said pair:
processing each acquired image to determine the position of said pointer therein and recording the position together with a timestamp representing the time elapsed between a reference point common to said cameras and the time the image was acquired; and
interpolating between pairs of recorded positions to generate interpolated positions and recording each interpolated position together with a synchronization time representing a time each image would have been acquired had said cameras been synchronized.

2. The method of claim 1 wherein said interpolating is performed between each successive pair of recorded positions.

3. The method of claim 2 wherein said reference point is a signal sent to each of said cameras simultaneously.

4. The method of claim 3 further comprising the step of initiating a timer associated with each camera in response to said signal and reading the value of said timer when each image is acquired, the value of said timer constituting said timestamp.

5. The method of claim 1 wherein for each camera, said processing step and interpolating step are performed by a processor of that camera.

6. The method of claim 1 wherein for each camera, said processing step is performed by a processor of that camera and wherein said interpolating step is performed by an external processor receiving the recorded interpolated positions and synchronization times from each camera.

7. The method of claim 1 wherein each interpolated position is calculated using the equation:

$$X_S = ((X_1 - X_0)/(T_1 - T_0)) * (T_S - T_0) + X_0$$

where:
$X_0$ and $X_1$ are successive x-positions of said pointer;
$T_1$ and $T_0$ are successive timestamps corresponding to the x-positions $X_1$ and $X_0$; and
$T_S$ is a given synchronization time, where $T_0 \leq T_s \leq T_1$.

8. The method of claim 7 wherein each camera records positions and timestamps in a history table, the history table maintained by each camera holding the Nth most recent recorded positions and associated timestamps, the value of N being selected to provide a sufficient number of generated interpolated positions to ensure that at least one interpolated position generated for each camera between resets of said camera has an equivalent synchronization time.

9. In a camera-based touch system including at least one pair of cameras having overlapping fields of view and a touch surface encompassed within said overlapping fields of view across which a pointer is moved, wherein the cameras of said at least one pair acquire images at intervals asynchronously, a method of estimating the position of said pointer relative to said touch surface from image data acquired by said at least one pair of cameras, said method comprising the step of:

for each camera in said pair:
processing each acquired image to determine the position of said pointer therein and recording the position together with a timestamp representing the time elapsed between a reference point common to said cameras and the time the image was acquired; and
interpolating between successive pairs of recorded positions to generate interpolated positions and recording said interpolated positions together with synchronization times representing times the images would have been acquired had said cameras been synchronized; and
determining interpolated positions generated by said cameras having equivalent associated synchronization times and triangulating the interpolated positions to estimate the position of the said pointer relative to said touch surface.

10. The method of claim 9 wherein each camera records positions and timestamps in a history table.

11. The method of claim 10 wherein the history table maintained by each camera holds the Nth most recent recorded positions and associated timestamps, the value of N being selected to provide a sufficient number of generated interpolated positions to ensure that at least one interpolated position generated for each camera between resets of said camera has an equivalent synchronization time.

12. The method of claim 11 wherein the interpolated positions and the associated synchronous times for each camera are stored in a synchronization table.

13. The method of claim 12 wherein N is equal to 6 and wherein each synchronization table holds four interpolated positions and associated synchronous times.

14. The method of claim 11 wherein said reference point is a signal sent to each of said cameras simultaneously.

15. The method of claim 14 further comprising the step of initiating a timer associated with each camera in response to said signal and reading the value of said timer when each image is acquired, the value of said timer constituting said timestamp.

16. The method of claim 15 wherein the intervals between acquisition of successive images by each camera are equal and wherein intervals between succesive synchronization times are equal.

17. The method of claim 16 wherein the intervals between successive synchronization times are greater than or equal to the intervals between acquisition of successive images by each camera.

18. The method of claim 11 wherein for each camera said processing step and interpolating step are performed by a processor of that camera.

19. The method of claim 11 wherein for each camera said processing step is performed by a processor of that camera and wherein said interpolating step is performed by an external processor receiving the recorded interpolated positions and synchronization times from each camera.

20. The method of claim 9 wherein each interpolated position is calculated using the equation:

$$X_S = ((X_1 - X_0)/(T_1 - T_0)) * (T_S - T_0) + X_0$$

where:
- $X_0$ and $X_1$ are successive x-positions of said pointer;
- $T_1$ and $T_0$ are successive timestamps corresponding to the x-positions $X_1$ and $X_0$; and
- $T_S$ is a given synchronization time, where $T_0 \leq T_s \leq T_1$.

21. A camera-based touch system comprising: at least one pair of cameras associated with a touch surface and having overlapping fields of view encompassing said touch surface, said at least one pair of cameras acquiring images of said touch surface from different locations and generating image data; a processor receiving and processing the image data generated by said at least one pair of cameras to determine the location of an object relative to the touch surface by triangulation when the object is captured in images acquired by the at least one pair of cameras; and a synchronization mechanism to synchronize image data generated by said at least one pair of cameras; wherein each camera processes each image acquired thereby to determine the position of the object therein and records the position together with a timestamp representing the time elapsed between a reference point common to said cameras and the time the image was acquired, and wherein said synchronization mechanism interpolates between successive pairs of recorded positions to generate interpolated positions, the interpolated positions being recorded together with synchronization times representing times the images would have been acquired had said cameras been synchronized, said processor using interpolated positions generated by the cameras having equivalent associated synchronization times to determine the location of the object using triangulation.

22. A touch system according to claim 21 wherein said synchronization mechanism calculates the interpolated positions using the equation:

$$X_S = ((X_1 - X_0)/(T_1 - T_0)) * (T_S - T_0) + X_0$$

where:
- $X_0$ and $X_1$ are successive x-positions of said pointer;
- $T_1$ and $T_0$ are successive timestamps corresponding to the x-positions $X_1$ and $X_0$; and
- $T_S$ is a given synchronization time, where $T_0 \leq T_s \leq T_1$.

23. A touch system according to claim 22 wherein each camera records the positions and timestamps in a history table, said history table holding the Nth most recent recorded positions and associated timestamps, the value of N being selected to provide a sufficient number of generated interpolated positions to ensure that at least one interpolated position generated for each camera between resets of said cameras has an equivalent synchronization time.

24. A touch system according to claim 23 wherein said reference point is a signal sent to each of said cameras simultaneously by said processor.

* * * * *

UNITED STATES PATENT AND TRADEMARK OFFICE
CERTIFICATE OF CORRECTION

PATENT NO. : 7,184,030 B2 Page 1 of 1
APPLICATION NO. : 10/724633
DATED : February 27, 2007
INVENTOR(S) : Randy McCharles et al.

It is certified that error appears in the above-identified patent and that said Letters Patent is hereby corrected as shown below:

On the cover page, below item (65) insert the following:

Related U.S. Application Data
(60)   Continuation of Application No. 10/180,897, filed on June 27, 2002, now abandoned.

Column 1, Line 6 "This application claims the benefit of U.S. patent application Ser. No. 10/180,897, filed Jun. 27, 2002." Should read --This application is a continuation of U.S. Patent Application No. 10/180,897, filed June 27, 2002, now abandoned.--

Signed and Sealed this

Twenty-sixth Day of June, 2007

JON W. DUDAS
*Director of the United States Patent and Trademark Office*